(12) United States Patent
Hata

(10) Patent No.: US 10,284,116 B2
(45) Date of Patent: May 7, 2019

(54) DRIVE MECHANISM

(71) Applicant: MICROB CO., LTD., Osaka (JP)

(72) Inventor: Yoshiaki Hata, Osaka (JP)

(73) Assignee: MICROB CO., LTD., Osaka (JP)

( * ) Notice: Subject to any disclaimer, the term of this patent is extended or adjusted under 35 U.S.C. 154(b) by 267 days.

(21) Appl. No.: 15/108,548

(22) PCT Filed: Dec. 24, 2014

(86) PCT No.: PCT/JP2014/084154
§ 371 (c)(1),
(2) Date: Jun. 27, 2016

(87) PCT Pub. No.: WO2015/098968
PCT Pub. Date: Jul. 2, 2015

(65) Prior Publication Data
US 2016/0322920 A1    Nov. 3, 2016

(30) Foreign Application Priority Data

Dec. 28, 2013  (JP) ................................. 2013-273693

(51) Int. Cl.
*H02N 2/04* (2006.01)
*H02N 2/02* (2006.01)
*H02N 2/06* (2006.01)

(52) U.S. Cl.
CPC .............. *H02N 2/04* (2013.01); *H02N 2/025* (2013.01); *H02N 2/026* (2013.01); *H02N 2/067* (2013.01)

(58) Field of Classification Search
CPC .................................. H02N 2/02; H02N 2/04
See application file for complete search history.

(56) References Cited

U.S. PATENT DOCUMENTS 4,894,579 A   1/1990 Higuchi et al.
5,490,015 A   2/1996 Umeyama et al.
(Continued)

FOREIGN PATENT DOCUMENTS

JP    63-299785 A    12/1988
JP    6-315282 A     11/1994
(Continued)

OTHER PUBLICATIONS

International Search Report for PCT/JP2014/084154 dated Apr. 14, 2015.

*Primary Examiner* — J. San Martin
(74) *Attorney, Agent, or Firm* — Kenealy Vaidya LLP

(57) ABSTRACT

When an actuator using a conventional piezoelectric element is used as a general-purpose mechanical component, such as a linear actuator and an electric cylinder, the absence or weak constraint of a guide in the moving direction causes the problem that the moving direction of a moving member is changed or the moving member is rotated due to a change in the posture of the moving member by an external force. A restraint member presses a rectangular parallelepiped-shaped output shaft, which has high stiffness, thermal conductivity, and lubricity and to which a piezoelectric element is attached at one end, against a guide member so as to limit the degree of freedom to one degree, in order to realize a linear actuator, an electric cylinder, and a force generation device that can be used for general purposes and have a high straight movement property. Also, an output member having a mass that is commensurate with the mass of the piezoelectric element is attached to the other end of the output shaft to improve a generated force, stiffness, and usability.

14 Claims, 17 Drawing Sheets

(56) References Cited

U.S. PATENT DOCUMENTS

| | | | |
|---|---|---|---|
| 5,589,723 A * | 12/1996 | Yoshida | G02B 7/08 |
| | | | 310/323.02 |
| 5,912,527 A | 6/1999 | Karrai | |
| 6,765,335 B2 * | 7/2004 | Wischnewskiy | H01L 41/0986 |
| | | | 310/323.02 |
| 2003/0122451 A1 * | 7/2003 | Seki | H02N 2/106 |
| | | | 310/323.01 |
| 2005/0035687 A1 * | 2/2005 | Xu | H02N 2/023 |
| | | | 310/328 |
| 2007/0036534 A1 * | 2/2007 | Sasaki | G02B 7/102 |
| | | | 396/85 |
| 2007/0228885 A1 | 10/2007 | Manabe | |
| 2008/0148589 A1 * | 6/2008 | Haft | H02N 2/025 |
| | | | 33/613 |
| 2008/0238251 A1 * | 10/2008 | Onozuka | G02B 7/08 |
| | | | 310/317 |
| 2010/0220404 A1 | 9/2010 | Ugawa et al. | |
| 2010/0271715 A1 * | 10/2010 | Shibatani | G02B 7/023 |
| | | | 359/813 |
| 2017/0047864 A1 * | 2/2017 | Stang | H02N 2/026 |

FOREIGN PATENT DOCUMENTS

| | | |
|---|---|---|
| JP | 2005-304147 A | 10/2005 |
| JP | 2007-274757 A | 10/2007 |
| JP | 2007-300708 A | 11/2007 |
| JP | 2009-77544 A | 4/2009 |
| JP | 2009-151273 A | 7/2009 |
| JP | 2012-222883 A | 11/2012 |

* cited by examiner

DRIVE MECHANISM

TECHNICAL FIELD

The present invention relates to a device for converting electrical energy into a driving force.

BACKGROUND ART

Conventionally there are piezoelectric impact drive mechanisms, as devices that convert electrical energy into mechanical work through the use of a piezoelectric element (for example, refer to Patent Literatures 1 and 2).

In the Patent Literature 1, a moving member is fixed to the one end of a piezoelectric element 12 and an inertial member is fixed to the other end thereof, so as to drive the moving member in minute steps. In the Patent Literature 2, a moving member to which a piezoelectric element is fixed moves a microlens connected to the moving member.

CITATION LIST

Patent Literature
Patent Literature 1: Japanese Patent Application Laid-Open No. SHO 63-299785
Patent Literature 2: Japanese Patent Application Laid-Open No. HEI 06-315282

SUMMARY OF INVENTION

Technical Problem

Conventionally, there are mechanisms in which a piezoelectric element is attached to a moving member at one end, and quickly deformed to move the moving member by an application of an impact to the moving member. In the example of the Patent Literature 1, the inertial member is attached to the other end of the piezoelectric element, such that the piezoelectric element and the inertial member generate an impact. This mechanism has the advantages of being able to realize a miniaturized direct-driving mechanism and extend a moving distance of the moving member in an arbitrary manner, due to the use of the piezoelectric element as a drive source. However, if the mechanism is intended to be used as a general-purpose mechanical component, such as a linear actuator and an electric cylinder actuator, the example of the Patent Literature 1 has no guide in the moving direction or a guide with a weak restraint, and thereby the moving direction of the moving member may be changed or a change in the posture of the moving member due to an external force may cause a rotation.

In the example of the Patent Literature 2, the moving member braces and is in pressure contact with a surrounding member with braces or projections protruding from the moving member, to obtain appropriate friction. There are no specific measures for maintaining the straight movement property of the moving member and preventing the rotation of the moving member in the actuator by itself, thus lowering the ability to maintain the moving direction at constant and prevent the rotation by keeping a constant posture against an external force.

These examples aim at specific applications such as driving in minute steps or driving for micro optics, and therefore take no measures against a reactive force from an object due to a generated force, and an external force. This causes a problem that the reactive force or the external force tends to cause a change in the moving direction of the moving member or a rotation of the moving member due to a change in the posture of the moving member. Also, the low ability to maintain the moving direction at constant and prevent the rotation by keeping the constant posture causes problems that the mechanisms are susceptible to the reactive force from an object, which exerts a force as a reaction upon the generated force, and the generated force cannot be increased.

Solution to Problem

In a drive mechanism according to the present invention, a restraint member presses a rectangular parallelepiped-shaped output shaft having high stiffness, thermal conductivity, and lubricity to which a piezoelectric element is attached at one end, against a guide member so as to limit a degree of freedom to one degree. Thus, it is possible to realize a linear actuator, an electric cylinder, and a force generation device that are usable as general-purpose mechanical components, have reduced size and weight, can be manufactured at a low cost even in low-volume production, produce a high generated force, and have a good straight movement property.

The restraint member screwed to the guide member tightly presses the output shaft against the guide member, so that the output shaft, the guide member, and the restraint member are in tight contact with one another in a four-surface contact area that extends in the direction of outputting a force of the output shaft. Thus, the straight movement property and stability in the posture of the output shaft can be maintained by a simple structure, and the generated force can be increased by increasing a pressing force of the restraint member.

Attaching an output member having a mass that is commensurate with the mass of the piezoelectric element at an output end of the output shaft makes it possible to prevent damage or wear in the output end, to facilitate attaching a tip tool, to increase the generated force of the drive mechanism of this devise, and to reduce an effect on a vibration characteristic of this drive mechanism when the tip tool is attached to the output member, thus allowing stable operation of the drive mechanism of the present invention even with the attachment of the tip tool.

A carbon fiber reinforced plastic (CFRP) is used for the output shaft, and a copper alloy or stainless steel is used for the guide member and the restraint member. This makes it possible to lessen friction between the output shaft and the guide member or the restraint member through the use of self-lubrication property of carbon fibers even without any lubricant, or through the use of the property of a lubricant when a fluorinated lubricant that has an excellent oxidation resistance property, such as perfluoropolyether or chlorotrifluoroethylene, is used. Furthermore, an increase in a surface contact area allows continuous driving, even if the output shaft seems to stay relative to the guide member and the restraint member or a force larger than the generated force of the drive mechanism moves an object to which the force is to be exerted, thus realizing a force generation device that can keep applying a pushing force or a drawing force to the object.

Advantageous Effects of Invention

According to the drive mechanism of the present invention, it is possible to provide a force generation device, a linear actuator, and an electric cylinder that have reduced size and weight, have high stiffness, and are usable as general-purpose mechanical components that can generate a high driving force, at a low manufacturing cost.

DESCRIPTION OF EMBODIMENTS

Figure 1:
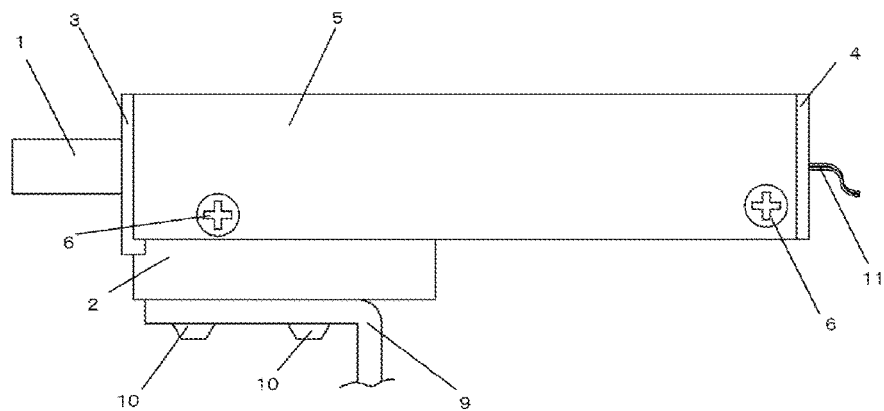
FIG. 1 is a side view of a drive mechanism illustrating an embodiment of the present invention.
Figure 2:
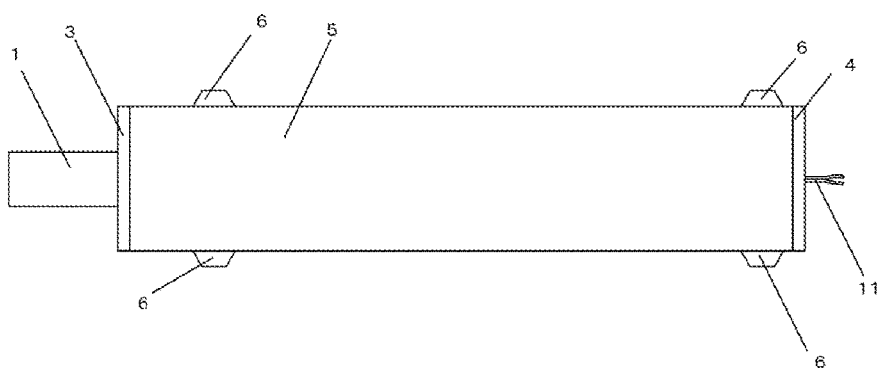
FIG. 2 is a plan view of the same drive mechanism.
Figure 3:
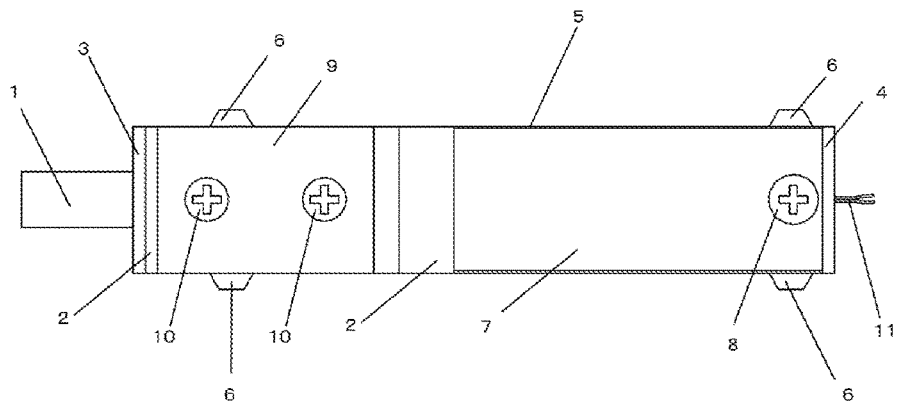
FIG. 3 is a bottom view of the same drive mechanism.
Figure 4:
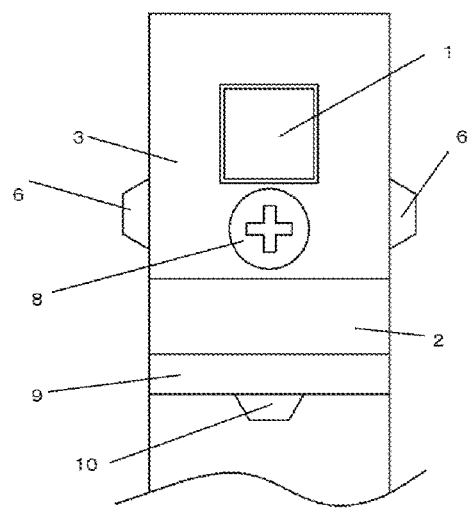
FIG. 4 is a front view of the same drive mechanism.
Figure 5:
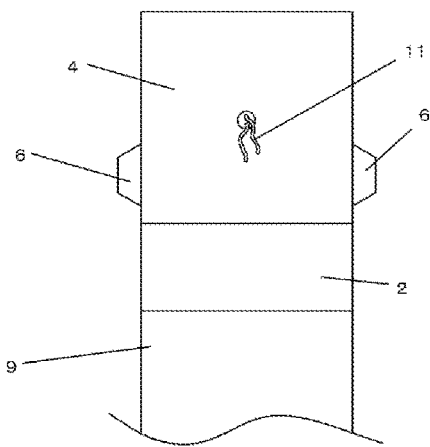
FIG. 5 is a rear view of the same drive mechanism.

FIG. 1 is a side view of this drive mechanism, FIG. 2 is a plan view thereof, FIG. 3 is a bottom view thereof, FIG. 4 is a front view thereof, and FIG. 5 is a rear view thereof. In FIGS. 1 to 5, reference numeral 1 indicates an output shaft, 2 indicates a guide member, 3 and 4 indicate side plates, 5 indicates a cover, 6 indicates cover attaching screws, 7 indicates a bottom plate, 8 indicates side plate attaching screws, 9 indicates a part of an external device, 10 indicates external device attaching screws, and 11 indicates lead wires.

Figure 6:
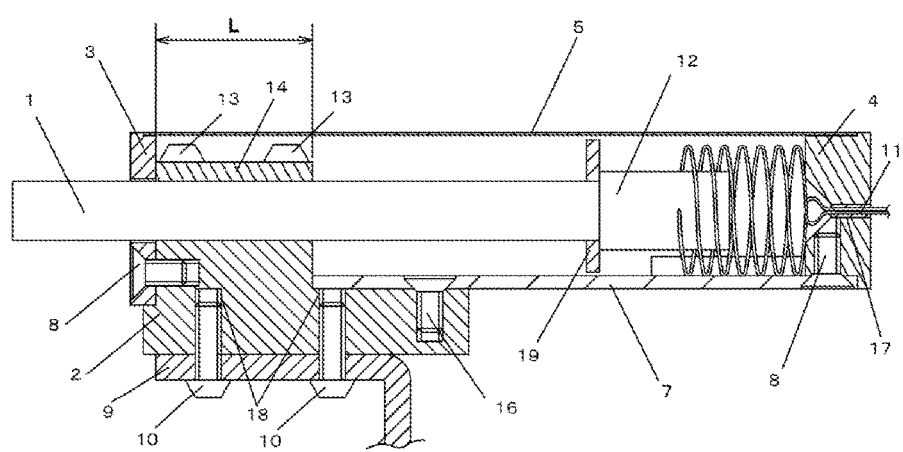
FIG. 6 is a partially sectional side view of the same drive mechanism.
Figure 7:
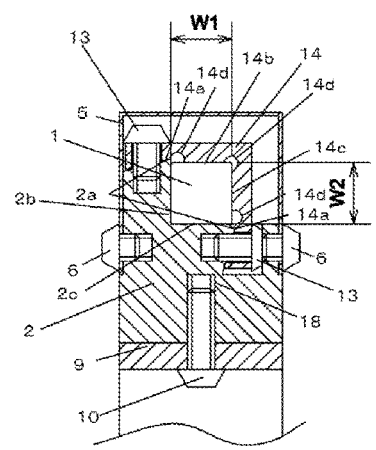
FIG. 7 is a partially sectional front view of the same drive mechanism.

FIGS. 6 and 7 are drawings in which some of the components are sectioned in the side view and the front view of this drive mechanism. The sectioned components are hatched.

In FIG. 6, a piezoelectric element 12 is attached to one of outer surfaces of the output shaft 1. The output shaft 1 is in the shape of a rectangular parallelepiped and the drive mechanism is formed into a slender and slim shape as a whole, to facilitate installing the drive mechanism in various mechanical equipment. Upon the application of a positive or negative voltage, the piezoelectric element 12 is extended or retracted in an output direction of the output shaft 1. A vibrator such as an electrostrictive element or a magnetostrictive element may be used instead of the piezoelectric element.

The direction of outputting a force of the output shaft coincides with a direction in which the center of the surface of the output shaft to which the piezoelectric element is attached and the center of an opposite surface thereof are connected to each other. L represents the length of contact portions of the guide member 2 and a restraint member 14 with the output shaft in the direction of outputting the force of the output shaft. The side plate 3 and the bottom plate 7 are screwed to the guide member 2 with the side plate attaching screw 8 and a bottom plate attaching screw 16, respectively. The side plate 4 is screwed to the bottom plate with the side plate attaching screw 8. The side plate 3 is formed with an opening that is larger than the output shaft, so that the output shaft can move without coming into contact with the side plate 3.

In FIG. 7, the output shaft 1 is held in a state of being caught between the guide member 2 and the restraint member 14 that is screwed to the guide member 2 with restraint member attaching screws 13. Inclined surfaces 14a of the restraint member 14 are pressed against inclined surfaces 2a of the guide member 2 by the attaching screws 13, and tend to move to the lower side of the inclined surfaces 2a. This action narrows the space enclosed with the restraint member 14 and the guide member 2, so that the restraint member 14 presses the output shaft 1 against the guide member 2.

Out of six outer surfaces of the output shaft, two adjoining surfaces of four surfaces that adjoin the surface to which the piezoelectric element is attached are pressed against the guide member, while the other two adjoining surfaces are pressed against the restraint member.

The restraint member 14 has two friction surfaces 14b and 14c. The restraint member 14 has a function of producing friction between each of the two adjoining surfaces of the output shaft 1 and the friction surface 14b or 14c, a function of pressing the other two adjoining surfaces of the output shaft 1 against two friction surfaces 2b and 2c of the guide member 2 to generate friction, and a function of restraining the degree of freedom of the output shaft in directions other than the output direction. Adjusting tightening torques of the restraint member attaching screws 13 makes it possible to press the output shaft against the guide member with a desired force. W1 and W2 represent widths of contact portions of the guide member 2 and the restraint member 14 with the output shaft 1, in directions orthogonal to the direction of outputting the force of the output shaft.

The restraint member 14 may be provided with grooves 14d so that the friction surfaces 14b and 14c of the restraint member 14 are easily located along the output shaft. A spring washer or a wave washer may be fitted between a screw head of the restraint member attaching screw 13 and the restraint member 14 to facilitate the adjustment of the tightening torque.

The guide member and the restraint member are in contact with the output shaft by a certain length in the output direction of the output shaft. If the length is too short, the effect of preventing the pitch and yaw of the output shaft in the directions other than the output direction of the output shaft is hard to obtain.

To effectively exert the force of the output shaft, an object desirably takes a posture and shape that are configured to substantially confront the output shaft, but it is conceivable that the direction of a normal to a contact portion between the object and the output shaft can deviate by up to an angle of 45° from the output direction of the force f of the output shaft. In the case of generating deviation by an angle of 45° or more, it is rational to change the direction of the output shaft relative to the object.

Figure 8:
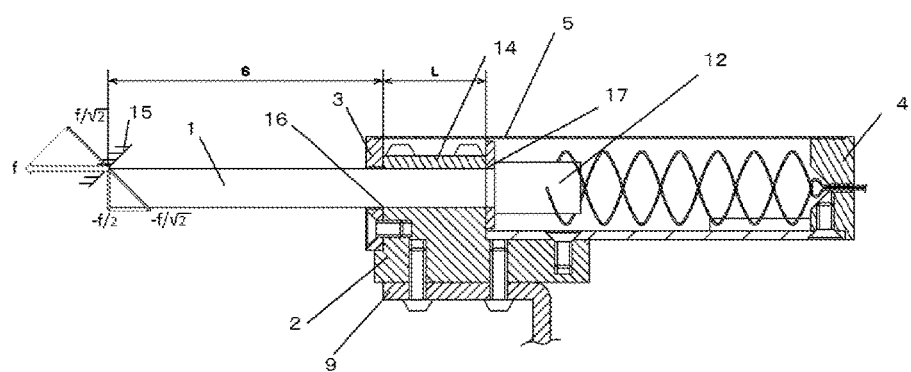
FIG. 8 is a partially sectional side view of the same drive mechanism in a state of being most protruded.

FIG. 8 is a drawing in which some of the components are sectioned in the side view in a state where the output shaft is most protruded. L represents the length by which the output shaft is in contact with the guide member and the restraint member in the direction of outputting the force of the output shaft. S represents a most protruded length of the output shaft from the guide member and the restraint member. The length L by which the output shaft is in contact with the guide member and the restraint member in the output direction of the output shaft is preferably determined in accordance with the length S by which the output shaft is protruded from the guide member and the restraint member.

When the direction of a normal to a contact portion between an object 15 and the output shaft deviates by 45° from the output direction of the force f of the output shaft as shown in FIG. 8, a reactive force of $-f/\sqrt{2}$ is exerted on the output shaft in the direction of the normal to the contact portion. A component of the reactive force in a direction orthogonal to the direction of outputting the force of the output shaft is $-f/2$, and therefore a turning moment of $-Sf/2$ is exerted on the output shaft with respect to an outside edge E1 of the guide member as a rotation center.

Owing to the turning moment of $-Sf/2$, the output shaft tries to lift an inside edge E2 of the restraint member with the outside edge E1 of the guide member as a fulcrum. The lift force is $-Sf/2$ L. As described later, the restraint member presses the output shaft with 7 or more times the output force of the output shaft, that is, with a force of 7 f or more.

The pressing force is dispersedly exerted on the entire contact surface between the restraint member and the output shaft. When the output shaft tries to lift the inside edge of the restraint member, however, the pressing force concentrates at the inside edge. Thus, when L and S have a relation of 7 f–Sf/2 L>0, the output shaft does not rotate. According to this inequality, when satisfying 14 L>S, the reactive force from the object does not rotate the output shaft. Since the forces are balanced when S is 14 times larger than L, L is preferably determined at a one-tenth or more the length of S, with an allowance of approximately 30% of the force to prevent the rotation.

The roll of the rotation of the output shaft is prevented by tightening the four outer surfaces of the output shaft, which has a rectangular or square cross section, with the guide member and the restraint member from four directions. As for the prevention of the roll, the widths W1 and W2 in the directions orthogonal to the direction of outputting the force of the output shaft, as shown in FIG. 7, become important. However, the moment to cause the roll of the output shaft is not largely exerted in an actual operation in consideration of the direction of the force outputted from the output shaft, and therefore the widths W1 and W2 are not required to be so long as to L, which is intended for the prevention of the pitch and yaw. The widths W1 and W2 are determined to be as wide as possible within the allowable range of the applications, size, design, and the like of this drive mechanism.

In FIGS. 1, 2, and 7, the cover 5, which is formed by bending a thin plate at two portions, is screwed to the guide member 2 and the side plate 4 with cover attaching screws 6. Since the guide member 2, the side plate 3, the bottom plate 7, the side plate 4, and the cover 5 are mutually screwed and form a box-shaped structure, a minimum number of thick components form the robust structure as a whole. Thus, this drive mechanism can be robust while reducing the size, weight, and cost thereof.

In FIGS. 6 and 7, an upper portion of the guide member 2 serves as a guide portion having a function of guiding the output shaft, and a lower portion of the guide member 2 serves as an interface portion with external equipment. Since the guide portion of the guide member and the restraint member are disposed around four surfaces of the periphery of a drive shaft in a space having an approximately equal thickness, the output shaft is disposed so as to enter and exit this drive mechanism from a central portion excluding the interface portion when this drive mechanism is viewed from the front side and the top side as shown in FIGS. 4 and 2. Thus, this drive mechanism can improve the usability and have a favorable appearance design.

In FIG. 6, two lead wires 11 for driving are drawn out of the piezoelectric element 12, contained in this drive mechanism in a helically wound manner, and drawn to the outside through a hole 17 formed in the central area of the side plate 4. The lead wires are bonded to the side plate 4 at the hole 17. When the position of the piezoelectric element 12 is changed inside this drive mechanism, the helically wound portions of the lead wires are extended or retracted, so that a drive signal is applied to the piezoelectric element 12 even if the piezoelectric element 12 is situated in any position. FIG. 8 shows a state of the helical portions of the lead wires, when the position of the output shaft 1 is changed. The lead wires drawn out of the side plate are connected to a drive circuit, and the application of the drive signal to the piezoelectric element 12 generates a force for moving the output shaft 1 relative to the guide member 2 and the restraint member 14.

In FIG. 7, since the output shaft 1 is pressed by the restraint member 14 and restrained to move along the two friction surfaces 2b and 2c of the guide member 2, it is possible to improve the straight movability of the output shaft 1. The above-described pressing force can be adjusted by the degree of tightening the restraint member attaching screws 13. The restraint member attaching screws 13 are tightened to improve the driving force during energization, the holding force of the output shaft 1 during non-energization, and the capability of preventing the rotation of the output shaft 1 owing to an external force applied to the output shaft 1. To increase the moving speed of the output shaft 1, the restraint member attaching screws 13 are loosened.

As an example of specifications, when the output shaft of this drive mechanism is configured to output a force of 10 N, each of the four surfaces of the output shaft generates a force of 2.5 N. According to materials and finishing conditions used in this drive mechanism, as described later, the coefficient of kinetic friction between the output shaft 1 and the guide member 2 or the restraint member 14 is 0.1 to 0.15, though there is a variation depending on the presence or absence of a lubricant. To generate the force of 2.5 N, a pressing force of 16.7 N or more, which is a division of 2.5 N by the coefficient of kinetic friction of 0.15, is required to be exerted on the four surfaces on which the output shaft 1 is in contact with the guide member 2 and restraint member 14. Since the restraint member 14 is screwed with a strong force enough to generate the pressing force, the output shaft 1 has no degree of freedom in directions other than the output direction, including a rotation of the output shaft 1.

The guide member 2 also has a function as an interface for fixing this drive mechanism to the external device. In FIGS. 6 and 7, the guide member 2 is provided with screw holes 18, and the guide member 2 is screwed to the external device 9 with the screws 10 to fix this entire drive mechanism on the external device. The guide member 2 has the friction surfaces 2b and 2c, which are used as the reference of movement of the output shaft 1 of this drive mechanism. Since the output shaft 1 always operates in a state of being pressed against the friction surfaces 2b and 2c, the guide member 2 is held so as to allow positioning of the output shaft 1 with high precision, and thereby the external device can precisely exert a force generated in the output shaft 1 on the object.

A force to drive the output shaft 1 occurs in the contact portions between the output shaft 1 and the guide member 2 or the restraint member. Thus, using the guide member 2, which is a site of occurrence of the force, for holding this entire drive mechanism allows a reduction in a turning moment to be applied to the external device when operating this drive mechanism, thus reducing an effect on the external device, such as a deformation in the external device.

Also, since the guide member is the thickest of all the components of this drive mechanism and robust with high stiffness, the use of the guide member for holding this entire drive mechanism allows preventing a reduction in performance caused by a distortion in the components by an external force during the operation of this drive mechanism.

Figure 9:
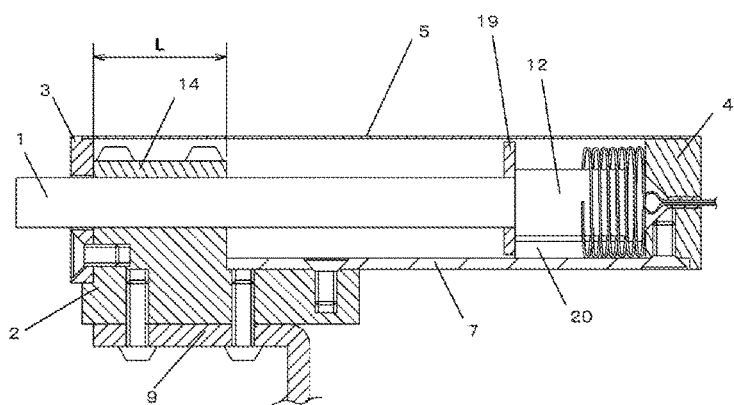
FIG. 9 is a partially sectional side view of the same drive mechanism in a state of being most retracted.

In FIG. 6, a plate-shaped stopper 19 is bonded to the output shaft 1 so as to enclose the output shaft 1 with leaving a minute gap from the bottom plate 7 and the cover 5, in the vicinity of a connection portion between the output shaft 1 and the piezoelectric element 12. When the output shaft 1 is most extruded, the stopper 19 bumps against the guide member 2 to stop the movement of the output shaft 1. A bar-shaped regulating member 20 is bonded to the bottom plate so as to prevent the output shaft 1 from bumping against the plate 4 when the output shaft is most retracted. FIG. 9 shows a state in which the stopper 19 is bumping against the regulating member 20. The plate-shaped stopper 19 may be bonded to both of the output shaft 1 and the piezoelectric element 12, to reinforce the bonding between the output shaft 1 and the piezoelectric element 12.

When an external force such as a strong impact is applied to the output shaft 1, the stopper 19 bumps against the bottom plate or the cover so as to limit the rotation of the output shaft 1 about the vicinity of the guide member 2. This prevents the piezoelectric element 12 from breaking by bumping against the bottom plate or the cover and breaking.

A carbon fiber reinforced plastic (CFRP) is used for the output shaft 1, and a copper alloy or stainless steel is used for the guide member 2 and the restraint member 14. This makes it possible to lessen friction between the output shaft 1 and the guide member 2 or the restraint member 14 through the use of self-lubricating properties of carbon fibers even without any lubricant. Furthermore, by dispersing a pressure using surface contact, it is possible to realizes a force generation device that can keep applying a pushing force or a drawing force to an object by continuous driving, even if the output shaft 1 seems to stay relative to the guide member 2 and the restraint member 14.

In the carbon fiber reinforced plastic used for the output shaft, long carbon fibers are oriented in parallel to the direction in which the output shaft outputs the force, and a long contact area is ensured in a direction of relative movement between the output shaft and the guide member and between the output shaft and the restraint member, thus enhancing the effect of smoothing the relative movement.

Figure 10:
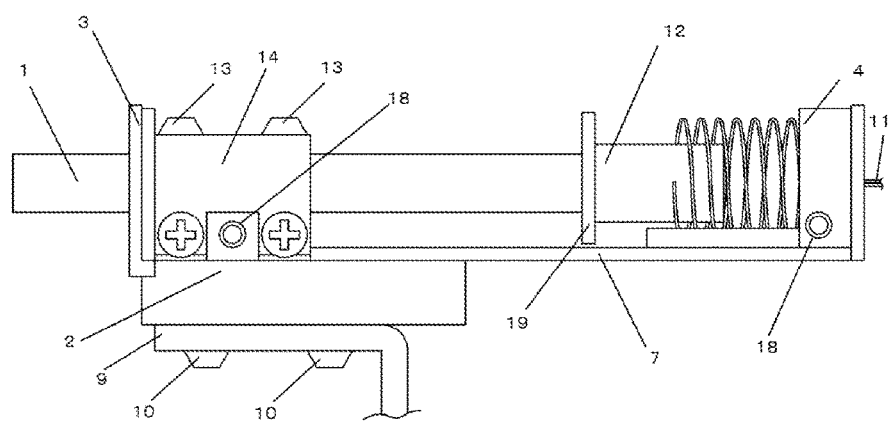
FIG. 10 is a side view of the same drive mechanism (without a cover).

FIG. 10 is a side view of this drive mechanism without a cover in which an output position is in an intermediate position. Screw holes 18 are provided in a side surface of the guide member 2 and a side surface of the side plate 4 to screw the cover 5 thereon.

In this drive mechanism, when performing an operation with attaching a tip tool such as a needle, a gripper, or an injector, to a tip end of the output shaft 1, the tip tool is required to be operated with precision. Thus, the output shaft 1 is structured so as not to rotate relative to the guide member 2.

In this drive mechanism, for the purpose of preventing the rotation of the output shaft 1 relative to the guide member 2, and realizing a function as a force generation device that can keep applying a pushing force or a drawing force to an object even in a state where the object stays or moves by a force specific to the object, which is one of characteristics of this drive mechanism, the output shaft 1, the guide member 2, and the restraint member 14 slide on flat surfaces that are finished with high precision. Thus, it is possible to prevent performance degradation owing to partial wearing and a change in surface conditions of the contact portions, even in continuous driving in a state where the output shaft 1 seems to stay or the output shaft 1 is moved forcedly by the force specific to the object.

Since the drive mechanism according to the present invention is a drive mechanism using vibrations of a submicron amplitude of a vibrator, the output shaft 1 and the slide surfaces of the guide member 2 and the restraint member 14 are required to be smooth surfaces that do not interfere with the submicron relative sliding movement between the surfaces and can prevent partial wearing and a change in surface conditions by dispersing a pressure between the surfaces. Therefore, the output shaft 1 and the slide surfaces of the guide member 2 and the restraint member are required to be processed by a processing method, such as grinding or lapping, that can obtain surfaces having flatness and suitable surface roughness.

The higher the processing precision, the more advantageous for the dispersion of the pressure between the surfaces. However, since this drive mechanism is used as a general-purpose mechanical element, each slide surface of the guide member and the restraint member has a precision of a flatness of 1 micrometer or less in the entire area and a surface roughness Ra of 0.4 or less, in consideration of a practical manufacturing cost. Each of opposite portions of the output shaft to the slide surfaces of the guide member and the restraint member has a precision of a flatness of 1 micrometer or less and a surface roughness Ra of 0.4 or less. The entire slide surfaces of the output shaft are finished smoothly without having a partial step or a twist.

The output shaft 1, and the guide member 2 and the restraint member 14 may be subjected to lapping if necessary, in order to improve the degree of adhesion between the slide surface of the output shaft 1 and the slide surface of the guide member 2 or the restraint member 14. In this drive mechanism, improving the flatness and the surface roughness to increase the degree of adhesion between the slide surfaces does not cause a malfunction, such as absorption between the slide surfaces, because of the minute vibration of the output shaft, the output shaft, the guide member, and the restraint member made of different kinds of materials, and the output shaft made of the slidable material.

As to the guide member and the restraint member, a sampling length for measurement of the surface roughness is substantially an entire length across the single slide surface. As to the output shaft, a sampling length is substantially an entire length across the portion opposite the slide surface of the guide member or the restraint member.

To slide the output shaft 1 along the guide member 2 and the restraint member 14 on the surfaces, the output shaft 1 is required to take the shape of a polygonal column such as a triangular prism or more.

The triangular prism having a small number of surfaces has a processing cost advantage in the step of eliminating the roughness of the shape. However, in the triangular prism, since some surfaces form an angle other than a right angle, an operation for increasing the precision of a rigid angle of a work requires time and effort, thus causing a cost increase. A method using a multispindle machine such as five axis milling cutter is conceivable, but increases a facility cost and a processing charge, thus causing a cost increase in low volume production. Furthermore, when the surfaces are finished with grinding or lapping, the work is hard to hold and two of the surfaces cannot be finished at the same time, thus causing an increase in finish processing cost. Also, in a finished component, angles formed by the surfaces are harder to measure than those of a rectangular parallelepiped, thus causing a cost increase.

A polygonal column such as a pentagonal prism or more is harder to produce and have angles harder to examine than a rectangular parallelepiped, just as with the triangular prism. The guide member 2 and the restraint member for maintaining friction become complicated in structure, and difficult to produce. Also, the pentagonal prism or more is near a round in cross section, in comparison with the triangular prism and a quadrangular prism, and impairs the effect of preventing the rotation, more specifically, the roll of the output shaft.

Therefore, the quadrangular prism is preferably used as the output shaft 1, and furthermore the rectangular parallelepiped shape has a cost advantage.

In the general quadrangular prism other than the rectangular parallelepiped, a bottom shape is not rectangular or square, and therefore some surfaces form an angle other than a right angle. The quadrangular prism is harder to make and has angles harder to examine than the rectangular parallelepiped, thus causing a cost increase. The guide member 2 and the restraint member require an increased manufacturing cost, and the mechanism has a complicated structure.

In the output shaft 1 in the shape of the rectangular parallelepiped, the remaining two surfaces unused for the slide also have a right angle with the side surfaces. Thus, the output shaft 1 in the shape of the rectangular prism has the effect of facilitating manufacture and an angle examination.

A vibrator is fixed to one of these surfaces. Since the vibration of the vibrator is applied to the direction of a normal of the surface, the vibration is effectively applied to the direction of an axis that the output shaft 1 has a degree of freedom, thus increasing the efficiency of this drive mechanism. The opposite surface to the surface to which the vibrator is fixed is used as an output end without fixing any member thereto or with fixing an output member. When the opposite surface is used as the output end, a surface orthogonal to the direction of the force generated by the output shaft 1 becomes the output end, which has a shape suited for pushing an object.

When an output member is fixed to an end of the output shaft as described later, this surface facilitates fixing the output member with reliability by, for example, bringing this surface into contact with a bonded surface of the output member during bonding. Since the direction of a normal of the bonded surface of the output member coincides with the direction of the force outputted by the output shaft 1, the force outputted by the output shaft 1 is effectively transmitted to the output member.

Under the circumstances described above, the output shaft 1 in the shape of a rectangular parallelepiped is effective in order to realize a linear actuator and a force generation device that can be manufactured at a low cost in low volumes and operate in a stable manner.

The surface of the output shaft to be the output end is not necessarily a perfect flat surface but may be deformed with a projection, a depression, or the like in accordance with the shape of an object, a required pressure amount, the shape of the output member to be attached, and the like. Also in the case of fixing the output member, if the bonded surface of the output member cannot be a flat surface for processing reasons, the surface of the output shaft may be deformed in accordance with the shape of the processed bonded surface.

The edges of the rectangular parallelepiped may be chamfered to prevent minute damage at the edges. The corners of the guide member 2 and the restraint member 14, which are combined with the output shaft 1, may be rounded to facilitate processing.

The output shaft is required to have high stiffness so as not to be deformed by the pressing force by the guide member and the restraint member and to exert the generated force on an object with high efficiency. The output shaft is also required to be light in weight so as to be efficiently vibrated by vibration applied by the piezoelectric element and to reduce the weight of the drive mechanism. Moreover, the output shaft is required to be made of a low frictional material so as to allow a relative vibration of the submicron amplitude on contact with the restraint member and the guide member.

As a material that satisfies these requirements, a carbon fiber reinforced plastic is suitable. Carbon fibers are light in weight and have a high modulus of elasticity and a low coefficient of friction, and thus satisfy the aforementioned requirements. In the output shaft used, the long carbon fibers are oriented in the output direction of the output shaft. This makes it possible to increase the modulus of longitudinal elasticity in the direction in which the output shaft outputs the force, and efficiently transmit the vibration from the piezoelectric element to the output shaft. Also, since the carbon fibers are oriented in the relative movement direction between the output shaft and the guide member or the restraint member, the guide member and the restraint member are in contact with the output shaft over a long distance in the direction of the fibers, thus making effective use of the favorable lubricity of the carbon fibers. A press by the restraint member and the guide member generates a pressure in the direction orthogonal to the orientation direction of the carbon fibers, but required compression stiffness can be obtained by making the volume ratio of the carbon fibers 60% or more in the carbon fiber reinforced plastic.

In the continuous driving in a state where the output shaft 1 seems to stay relative to the guide member 2 and the restraint member 14, the output shaft 1, the guide member 2, and the restraint member 14 repeat minute relative movements with a submicron amplitude in the same positions at a high frequency of 5 KHz or more, and the diffusion of frictional heat generated continuously and locally becomes important.

The use of the carbon fiber reinforced plastic using the oriented pitch-based carbon fibers as the material for the output shaft 1 has an advantage in the diffusion of the frictional heat. The oriented pitch-based carbon fibers have a thermal conductivity of 80 to 800 W/m·K, which is higher than a thermal conductivity of PAN-based carbon fibers of the order of 10 W/m·K. Hence the oriented pitch-based carbon fibers diffuse the frictional heat from its generated site through the output shaft 1 and the output member, and have the high effect of preventing an increase in temperature at the contact portions between the output shaft 1 and the guide member 2 or the restraint member 14 owing to the frictional heat, and thus preventing degradation in surface conditions, which leads performance degradation.

The oriented pitch-based carbon fibers have a modulus of elasticity in tension of the order of 640 to 935 GPa, which is higher than a modulus of elasticity in tension of the PAN-based carbon fibers of the order of 230 to 650 GPa, and hence is effective at increasing the stiffness of the output shaft and improving the performance of this drive mechanism.

As described above, the carbon fiber reinforced plastic having the long carbon fibers oriented in the output direction of the output shaft 1 is used for the output shaft 1. This makes it possible to efficiently diffuse heat from the frictional portions and heat from the piezoelectric element 12 in the orientation direction of the carbon fibers, and prevent performance degradation owing to the heat even in the case of the continuous driving.

As described later, when the output member is attached to the tip end of the output shaft 1, the output member also has the effect of diffusing heat transmitted through the output shaft 1.

Isotropic pitch-based carbon fibers, which are a type of the pitch-based carbon fibers, are unsuitable because of having a modulus of elasticity in tension of up to 40 GPa and being not able to increase the stiffness of the output shaft 1 due to short fibers.

The use of the guide member 2 as a holding member promotes heat diffusion from a holding part (the holding member), and realizes the effect of preventing performance degradation.

A lubricant may be used to increase a pressing force of the output shaft 1 against the guide member 2 and increase a force outputted from the output shaft. In the case of using the lubricant, the drive mechanism is required to be actuated in a state where the lubricant is present between the two surfaces pressed with a strong force. In the actuation from this state, an increase in the viscosity of the lubricant due to oxidation of the lubricant adversely affects the actuation. To facilitate the actuation, a fluorinated lubricating oil that has a good oxidation resistance property and a less viscosity increase due to oxidation, such as perfluoropolyether or chlorotrifluoroethylene, is used. Thus, it is possible to prevent deterioration in lubricity properties due to the oxidation of the lubricating oil, and the occurrence of an actuation malfunction caused by encumbering the minute relative movement between the output shaft 1 and the guide member 2 or the restraint member 14 excited by the minute vibration of the vibrator.

The lubricating oil can be used by, for example, being applied to the surface of the output shaft with a swab.

No thickener is used because if a thickener is added to the lubricating oil, the thickener caught between the surfaces with a strong pressure inhibits the minute relative movement between the output shaft 1 and the guide member 2 or the restraint member 14.

The output end of the output shaft 1 may be damaged or worn by being brought into contact with an object, and become a problem in use. A tip tool depending on the intended use, such as a rod, an injector, or a gripper may be required to be attached to the output end.

A case in which the output member is attached to the output end, for the purposes of preventing damage and wear of the output end and attaching an adopter or the tip tool, will be described.

Figure 11:
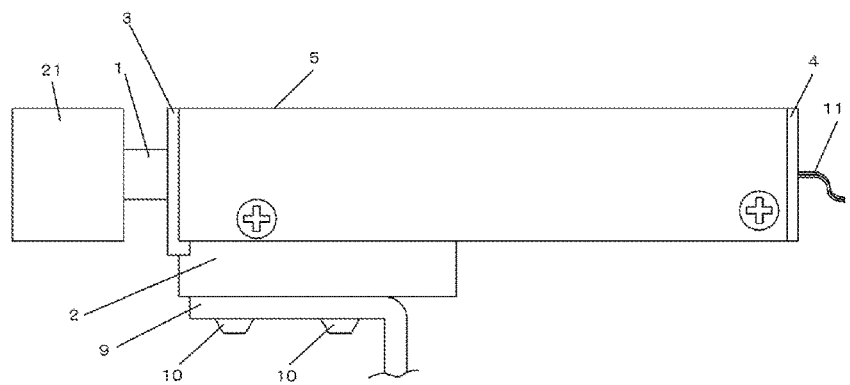
FIG. 11 is a side view of the same drive mechanism (having an output member).
Figure 12:
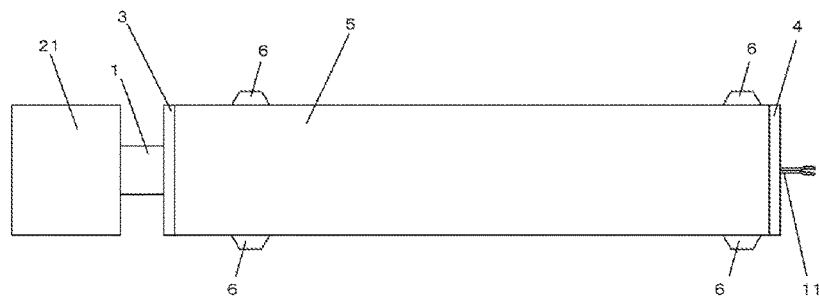
FIG. 12 is a plan view of the same drive mechanism (having the output member).
Figure 13:
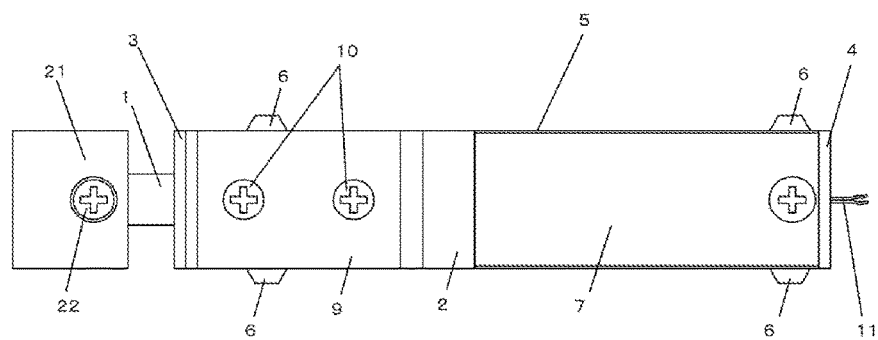
FIG. 13 is a bottom view of the same drive mechanism (having the output member).
Figure 14:
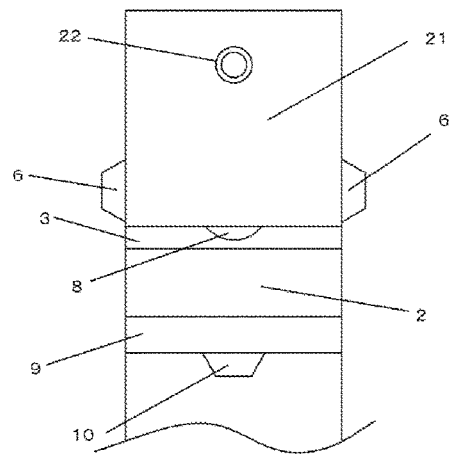
FIG. 14 is a front view of the same drive mechanism (having the output member).

FIG. 11 is a side view of this drive mechanism in which the output member is attached, FIG. 12 is a plan view thereof, FIG. 13 is a bottom view thereof, and FIG. 14 is a front view thereof. In FIGS. 11 to 14, an output member 21 is attached to a tip end portion of the output shaft 1. In FIG. 13, reference numeral 22 indicates an output member attaching screw.

The output member is made of a material with high stiffness that is resistant to damage and wear by contact with an object and is suitable for attachment of an adopter or a tip tool. More specifically, metal, ceramic, fiber reinforced plastic, and the like are suitable. The output member may be provided with a screw hole or stud for use in the attachment of the adopter or tip tool. In FIG. 14, a tool attachment screw hole 23 is provided in the tip end portion of the output member 21.

Figure 15:
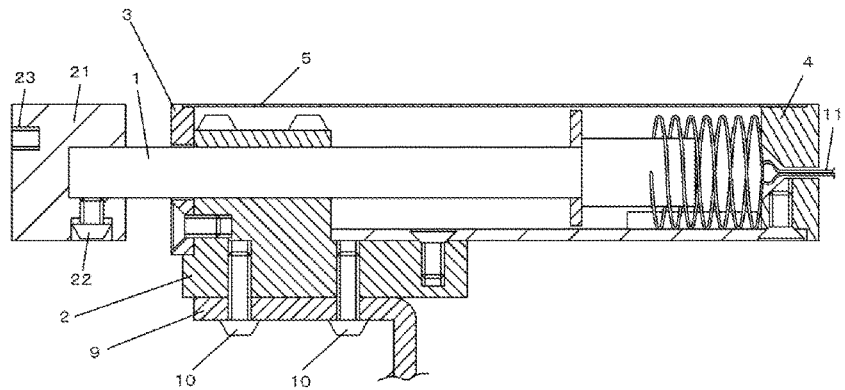
FIG. 15 is a partially sectional side view of the same drive mechanism (having the output member).

FIG. 15 is a drawing in which some of the components are sectioned in the side view of this drive mechanism to which the output member is attached. The sectioned components are hatched. By tightening the output member attaching screw 22, the output member 21 is attached to the output shaft 1. The output member 21 may be bonded to the output shaft 1 at a contact portion with the output shaft 1, to increase bonding strength.

Attaching the output member has the effects of improving the performances of the drive mechanism of the present invention, in addition to the effects of preventing damage and wear in the output end and facilitating attachment of the tip tool. One of the effects is that attaching the output member can increase a generated force of the drive mechanism of the present invention.

Another effect is to reduce the effect of adding the weight of the attached tip tool to a vibration unit including the output shaft 1, the piezoelectric element 12, and the output member on the vibration characteristic of the vibration unit, and allow stable operation of the drive mechanism of the present invention even with the attachment of the tip tool.

Figure 16:
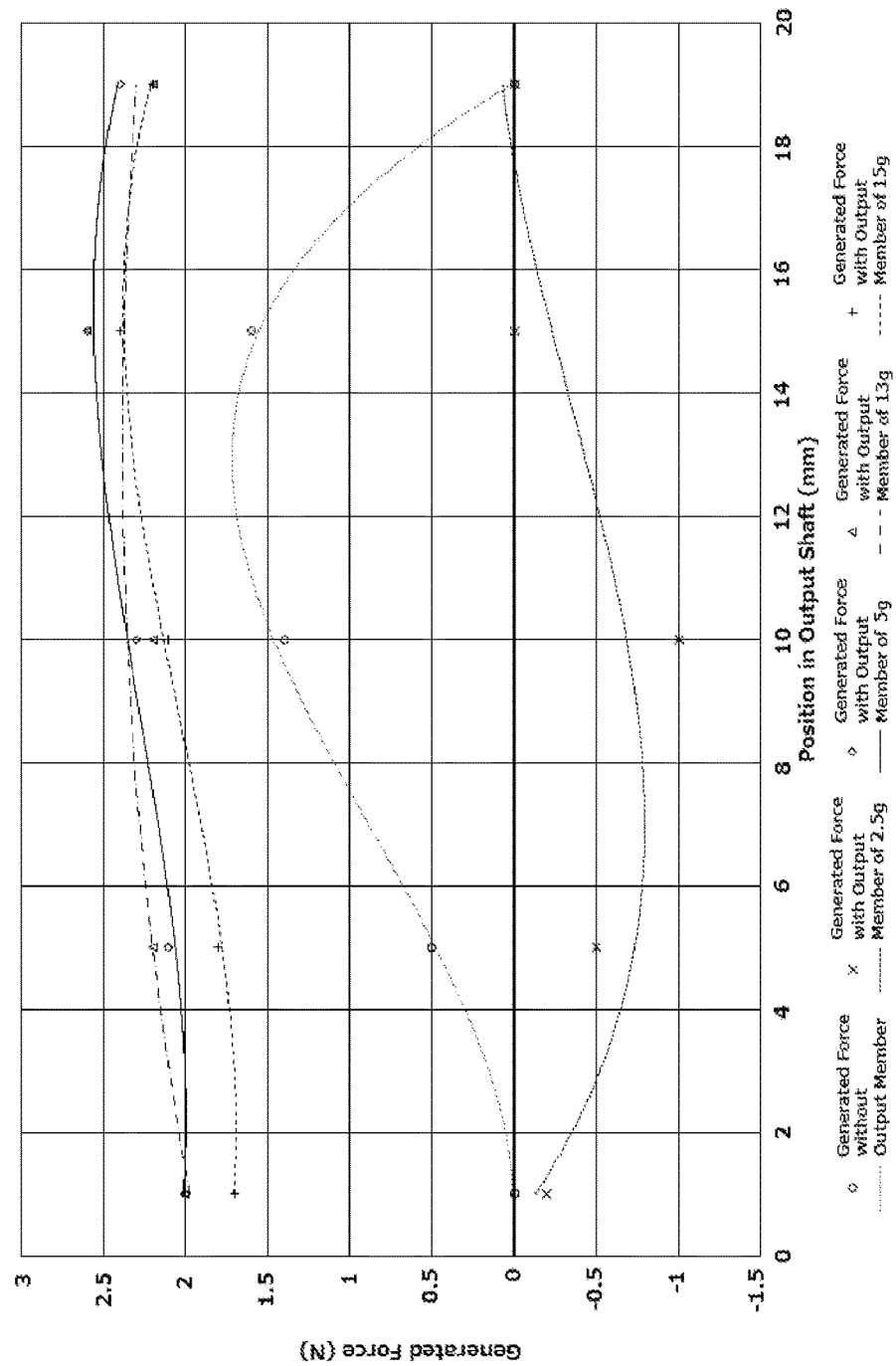
FIG. 16 is a graph of a generated force.

FIG. 16 is a graph of measurement that shows how the generated force of the drive mechanism varies with variations in the weight of the output member. The drive mechanism used in the measurement has a length of the output shaft of 30 mm, a length of the guide member and the restraint member of 10 mm in the direction of outputting the force of the output shaft, and a mass of the piezoelectric element of 1.3 g. A horizontal axis of the graph represents the position of the output shaft. The output shaft is at 1 mm in a state of being most retracted, and at 19 mm in a state of being most protruded. A vertical axis represents values of a pushing force of the output shaft measured by a force gauge. Measurement values and approximate curves in each condition are plotted in the graph.

At a mass of 0, which represents the absence of the output member, the generated force is small and the characteristic is susceptible to frequency to easily change. At a mass of the output member of 2.5 g, which is approximately twice as much as the mass of the vibrator, the generated force is small and the direction of the force is reverse. The generated force increases with an increase in the mass of the output member. At a mass of 5 g or more, the generated force becomes large and has a small variation depending on the position of the output shaft.

Attaching the output member having a mass that is commensurate with the mass of the vibrator, as described above, makes it possible to increase the generated force of the drive mechanism and allow the stable operation thereof. According to measurement results, the output member preferably has a mass of four or more times the mass of the vibrator. In this condition, this drive mechanism can operate stably even with attachment of the tip tool.

Figure 17:
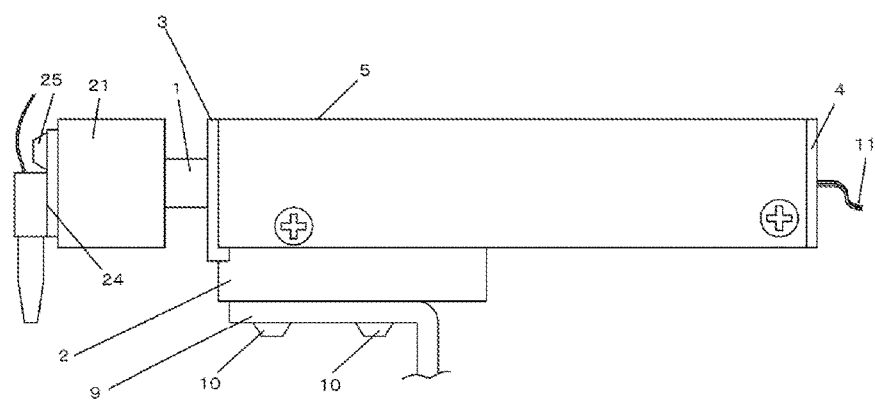
FIG. 17 is a side view of the tool-equipped drive mechanism illustrating the embodiment of the present invention.
Figure 18:
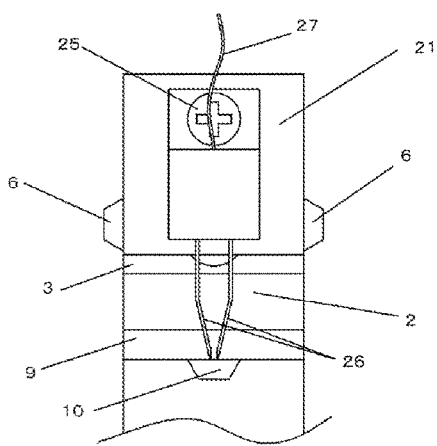
FIG. 18 is a front view of the same tool-equipped drive mechanism.

FIGS. 17 and 18 are a side view and a front view, respectively, in a case where a gripper is attached to the output member as the tip tool. A gripper unit 24 is attached to the output member 21 with a tool attaching screw 25. Two arms 26 for a grip and two lead wires 27 for supplying a drive signal are drawn out of the gripper unit 24, and the input of the drive signal opens and closes the arms to grip or release an object. Operating this drive mechanism after gripping the object enables an operation of moving the object to a desired position and releasing the object there. Various types of gripper units e.g. a gripper unit using a magnet coil or a motor are available.

Figure 19:
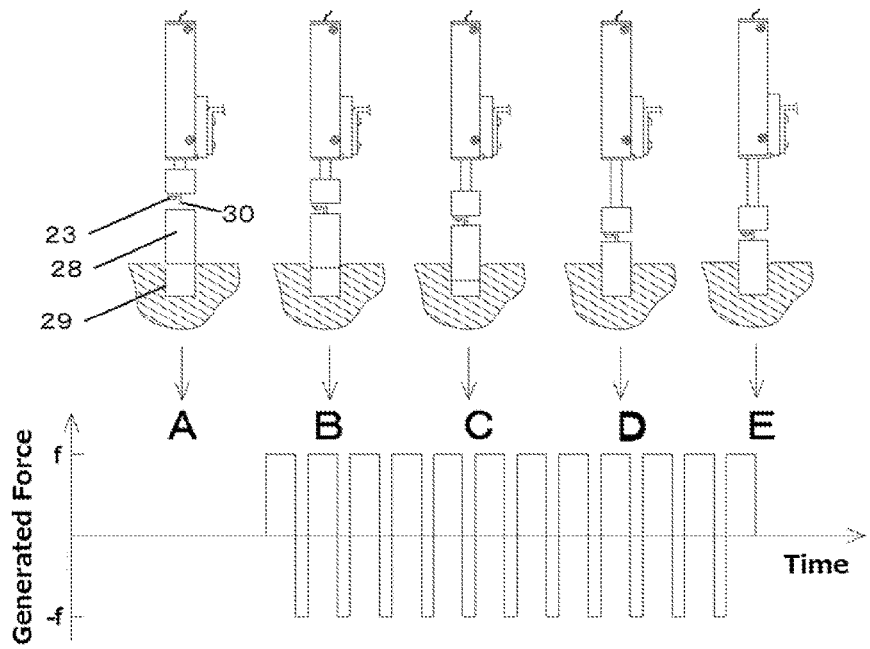
FIG. 19 shows an example of a pushing operation by the same drive mechanism.

FIG. 19 shows a driving method in which this drive mechanism is used for a pushing or press fitting operation of a component. The drawing shows an operation of pushing a rod-shaped component 28 into a hole 29.

A pushing tool 30 is screwed to the output member with a tool attaching screw 23. Before operating this drive mechanism, the hole 29, the rod-shaped component 28, and the pushing tool 30 are aligned (a state of A). The rod-shaped component is positioned and held above the hole by a not-illustrated holder. This drive mechanism is positioned and held above the rod-shaped component by an external device.

After this, this drive mechanism outputs a pushing force (f) and a drawing force (−f) alternately, to push in the rod-shaped component as an object with the intermittent forces. The drawing force is outputted for a shorter time than the pushing force. During outputting the drawing force, the pushing tool 30 is slightly retracted to create a gap between the pushing tool 30 and the rod-shaped component 28, and by the next output of the pushing force, the pushing tool 30 bumps against the rod-shaped component 28. By this continuous pushing operation, the pushing or press fitting operation can be smoothly performed.

Upon operating this drive mechanism, the output member 21 moves the pushing tool 30 with a predetermined force, so that the pushing tool presses the rod-shaped component 28 against the entrance of the hole 29 (state of B). By continuously operating this drive mechanism, the rod-shaped component 28 is pushed into the middle of the hole 29 against the resistance of fitting with the hole 29 (state of C). By continuing the operation of this drive mechanism, the rod-shaped component 28 reaches the bottom of the hole 29 (state of D). The operation of this drive mechanism is continued after completing the pushing, and the operation is completed after making sure the completion of the pushing (state of E). Upon completing the operation, the operation of this drive mechanism is ended. A graph in a lower portion of FIG. 19 shows a force outputted from the output shaft, the output member, and the pushing tool of this drive mechanism.

In this drive mechanism, it is not required to control the output of this drive mechanism, while monitoring an operation state by measuring the position and a load of the object with an encoder or a load cell, which can be driven continuously even in a state where the output shaft 1 seems to stay relative to the guide member 2 and the restraint member 14, thus realizing an easy-to-use device system at a low cost. This drive mechanism can be applied to a wide range of operations such as operations requiring a predetermined drawing force and operations holding a predetermined pressure, in addition to the pushing or press fitting operation.

Figure 20:
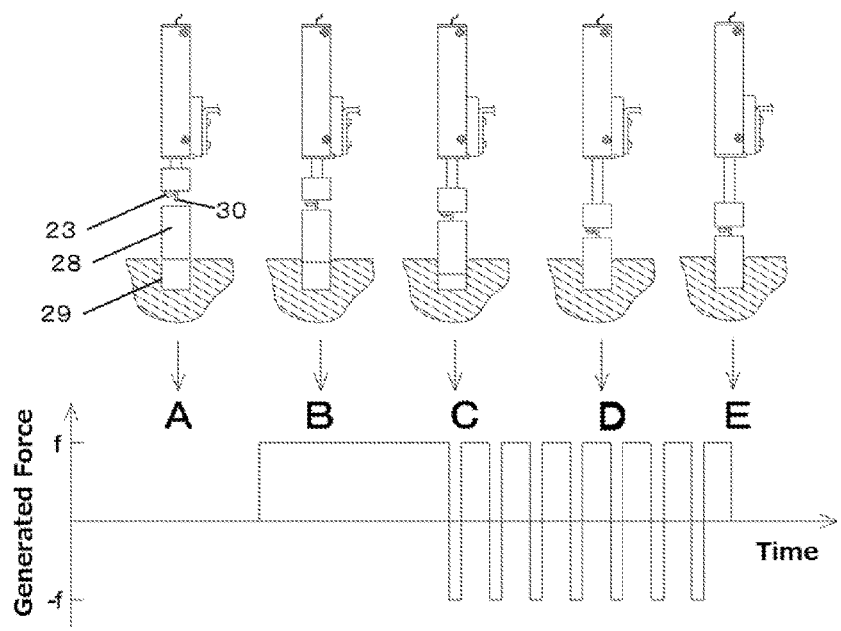
FIG. 20 shows a modification example of the pushing operation by the same drive mechanism.

FIG. 20 shows an example of pushing the rod-shaped component 28 as an object with an intermittent force, by keeping pushing the rod-shaped component 28 with a force of f from a state of A to a state of C and thereafter alternately outputting a pushing force (f) and a drawing force (−f) until a state of E. Thereby, since the positioning precision between the rod-shaped component 28 and the hole 29 is important, the rod-shaped component 28 is pushed with the constant force while a load of the operation is low, so as not to misalign the rod-shaped component 28, and an impact force is intermittently applied after the rod-shaped component 28 gets into the hole 29, to make sure the push.

Figure 21:
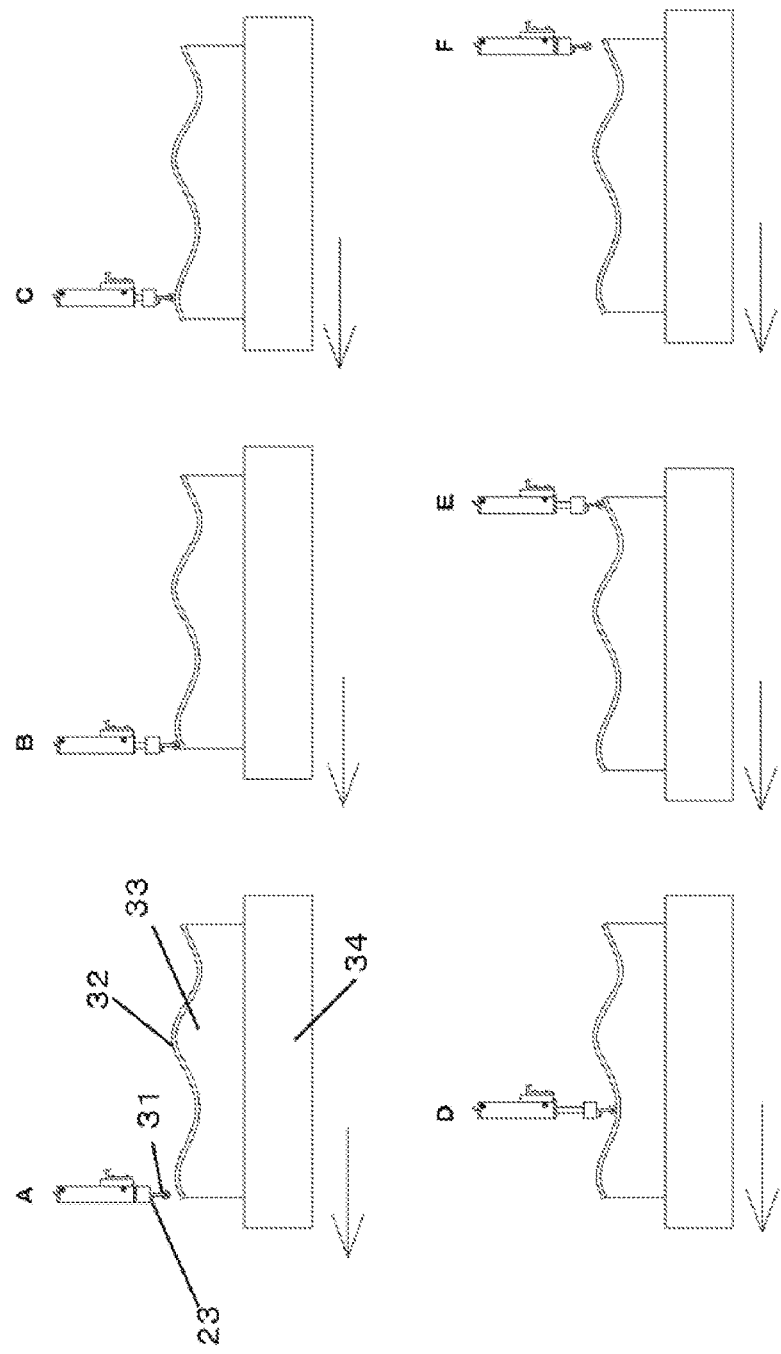
FIG. 21 shows an example of a sheet sticking operation by the same drive mechanism.

FIG. 21 shows an example in which this drive mechanism is used for sticking a sheet on a curved surface.

To the output member 21, a press roller tool 31 is screwed with the tool attaching screw 23. The press roller tool has a roller attached at its distal end to press an object while rotating the roller. A sheet 32 is stuck on the surface of a mount 33 having a curved surface. An adhesive is applied to the surface of the mount, and the sheet 32 is temporarily placed in a stuck position.

The mount placed on a moving table 34 is moved downward and stopped below this drive mechanism (state of A). When this drive mechanism is operated and a pushing force is generated in the output shaft, the press roller tool 31 presses an end portion of the sheet 32 against the mount (state of B). When restarting the movement of the moving table 34, the sheet 32 and the mount are moved while being pressed by the roller, and the sheet 32 is pressed against the mount throughout its length so as to firmly stick the sheet 32 on the mount (states of C to E). Upon completing the press of the sheet throughout its length, a force of −f is generated in the output shaft, and the press roller departs from the sheet 32 (state of F).

In this operation, the output shaft presses the press roller tool against an object with a set force output mode, which includes the pushing and drawing alternate operation, the pushing operation with a constant force, and the like, as described above. The output shaft changes its position in accordance with the unevenness of the object with being protruded from or retracted into the side plate. This operation makes it possible to keep applying a force to the object in a constant mode, even if the object is uneven. Also in this case, in this drive mechanism, it is not required to control the output of this drive mechanism, while monitoring an operation state by measuring a position and a load of an object with an encoder or a load cell, thus realizing an easy-to-use device system at a low cost.

In a case where the output member is attached to the output shaft or the tip tool is attached to the output member, the length L of the guide member and the restraint member in the direction of outputting the force of the output shaft is preferably set at one-tenth or more of S in a state where the output shaft is most protruded, when S represents the distance from the outside edges of the guide member and the restraint member to the output member or the tip end of the tip tool.

Figure 22:
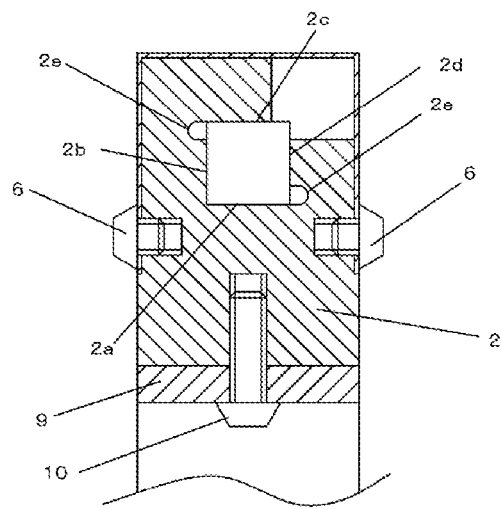
FIG. 22 shows a modification example of the same drive mechanism.

FIG. 22 shows another mode of the guide member 2 of this drive mechanism. In this mode, the restraint member is integrated into the guide member. The inside dimension of the guide member 2 is formed slightly smaller than the outside dimension of the output shaft 1. When the output shaft 1 is inserted, pressing surfaces 2*d* and 2*c* of the guide member press the output shaft 1 against the friction surfaces 2*b* and 2*a*, which are used as the reference of the movement of the output shaft 1, so that friction is generated between the guide member 2 and the output shaft 1. The output shaft 1 is restrained so as not to have a degree of freedom in directions other than the output direction of the output shaft 1.

Grooves 2*e* may be provided in part of the guide member, so that a portion of the guide member corresponding to the restraint member is easily located along the output shaft. This mode requires precise processing to obtain a predetermined catching force for catching the output shaft and hard-to-process contact surfaces with the output shaft, but allows reduction in the number of components and assembly steps.

Figure 23:
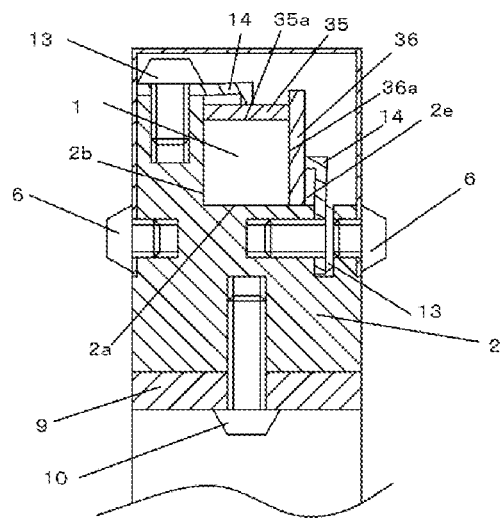
FIG. 23 shows a modification example of the same drive mechanism.

As shown in FIG. 23, the restraint member may be divided into restraint members 14 and retaining plates 35 and 36. The output shaft 1 is held in a state where the output shaft 1 is caught by the guide member 2, and the restraint members screwed to the guide member 2 with the restraint member attaching screws 13 and the retaining plates 35 and 36.

The restraint members 14 each have a hooked tip end and press friction surfaces 35*a* and 36*a* of the retaining plates 35 and 36, which are inserted between the restraint member 14 and the output shaft 1, against the output shaft 1 at their hooked tip end. The restraint members have the function of producing friction between each of the two surfaces of the output shaft 1 and the retaining plate 35 or 36, the function of pressing the other two surfaces of the output shaft 1 against two friction surfaces 2*b* and 2*c* of the guide member 2 to generate friction, and the function of restraining the degree of freedom of the output shaft in directions other than the output direction.

Since contact surfaces between the restraint member 14 and the retaining plates 35 and 36 are not subjected to specific smoothing such as grinding or lapping, a friction force between the restraint member 14 and the retaining plate 35 or 36 is twice or more as large as a friction force between the retaining plate 35 or 36 and the output shaft 1, so that the retaining plates 35 and 36 and the restraint member 14 do not move in a relative manner when this drive mechanism is operated. Thus, the force generated between the retaining plate 35 or 36 and the output shaft 1 can be effectively utilized, in addition to a force of the output shaft 1 exerting on the guide member 2, as a force that can be taken out of the output shaft 1.

As an example of specifications, when the output shaft of this drive mechanism is configured to output a force of 10 N, each of the four surfaces of the output shaft generates a force of 2.5 N. The coefficient of kinetic friction between the output shaft 1 and the guide member 2 or the restraining plates 35 or 36 is 0.1 to 0.15, though there is a variation depending on the presence or absence of a lubricant. To generate the force of 2.5 N, a pressing force of the order of 17 N or more, which is a division of 2.5 N by the coefficient of kinetic friction of 0.15, is required to be exerted on the four surfaces on which the output shaft 1 is in contact with the guide member 2 and the retaining plates 35 and 36.

Since the restraint member 14 presses the retaining plates with a force of 17 N or more, high friction is generated between the retaining plate 35 or 36 and an end face of the restraint members. It is considered that a ferrous or copper alloy material has a coefficient of friction of 0.5 or more under these contact conditions, and a frictional force between the retaining plate 35 or 36 and the end face of the restraint member is 8 N or more. This frictional force is much larger than the force of 2.5 N generated between the retaining plate and the output shaft, and therefore the retaining plates 35 and 36 and the restraint member 14 are not relatively moved.

This structure brings about a cost increase such as an assembly cost owing to increase in the number of the components, but facilitates the processing and finishing of the components.

Just as with the example of FIG. 7, inclined surfaces may be provided in the restraint member and the guide member. The inclined surfaces of the restraint member are pressed against the inclined surfaces of the guide member by the attaching screws 13, and tend to move to the lower side of the inclined surfaces.

Figure 24:
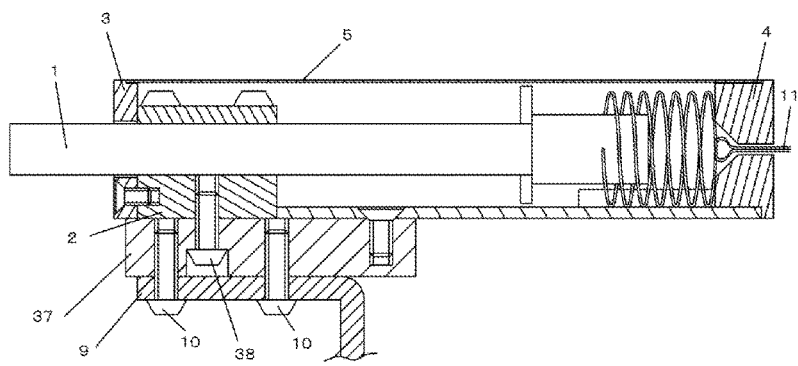
FIG. 24 shows a modification example of the same drive mechanism.

FIG. 24 shows an example in which the guide member 2 is divided into two bodies. To make the guide member, a guide member 2 and a guide member 37 are produced separately, thus allowing reduction in a manufacturing cost for the guide member. The divided guide members are coupled with a guide member coupling screw 38, and function as an integral component.

Figure 25:
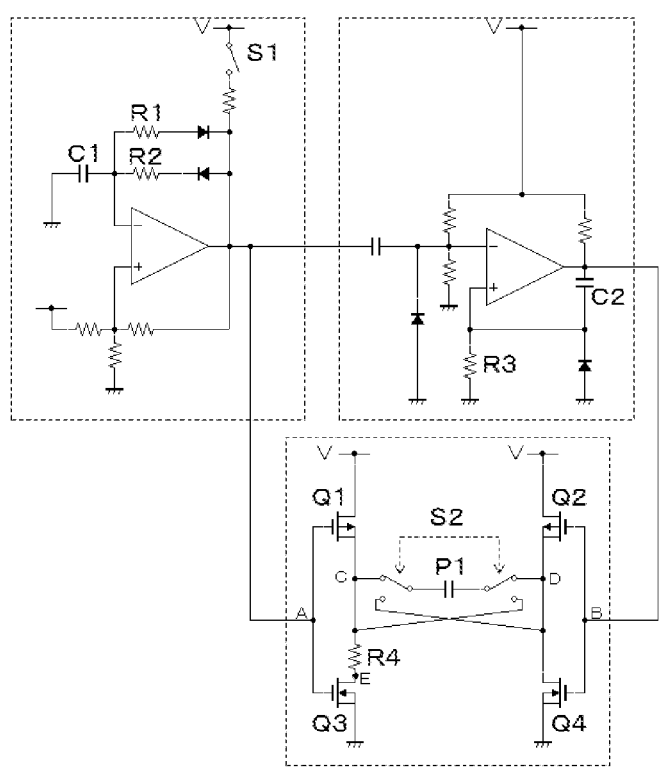
FIG. 25 shows a drive circuit.

FIG. 25 is a circuit diagram showing an example of a drive circuit for driving the piezoelectric element 12 in the present invention. The piezoelectric element 12 is shown in the circuit diagram. The circuit is divided into three blocks, and each block is enclosed by frames of broken lines. The upper left block is a pulse generator. The upper right block is a one-shot multi vibrator. The lower block is a drive unit for the piezoelectric element 12. In the following description of the circuit, the piezoelectric element 12 is referred to as a piezoelectric element P1.

The pulse generator uses an analog comparator, and continuously outputs pulses having a constant frequency and duty ratio in accordance with resistances R1 and R2 and a capacitance C1.

In FIG. 25, closing a switch S1 actuates the pulse generator, and generates a pulse waveform with a fundamental frequency of a waveform for driving the piezoelectric element P1. The pulse waveform preferably has a duty ratio of the order of 0.5 to 0.99, and is at a zero level for a sufficient time for a rapid charge or discharge of the piezoelectric element P1.

The one-shot multi vibrator generates one pulse of a predetermined duration, when the output of the pulse generator changes from a high level to a zero level. The duration of the pulse is determined on the basis of values of a resistance R3 and a capacitance C2. The duration of the pulse is set shorter than the duration of the high level of the continuous pulse waveform outputted from the pulse generator.

In the drive unit for the piezoelectric element 12, a resistance R4 for charging or discharging the piezoelectric element P1 at low speed and a direction switch S2 for switching an operation direction of this drive mechanism are added to a bridge circuit having P-ch CMOS FETs Q1 and Q2 and N-ch CMOS FETs Q3 and Q4.

Figure 26:
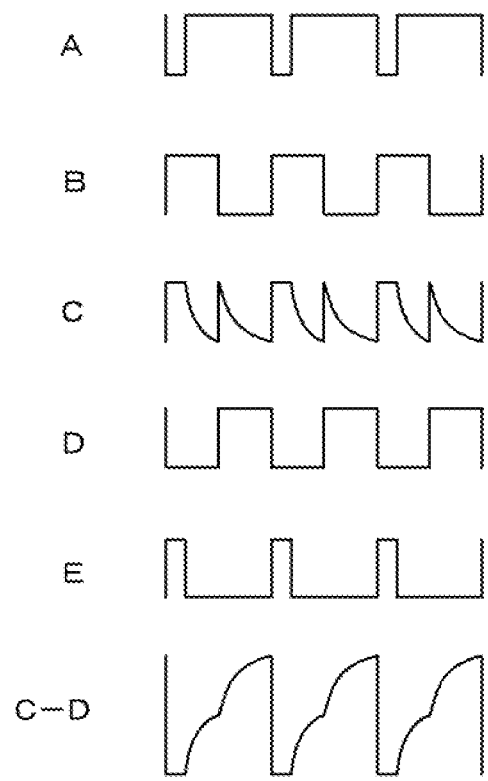
FIG. 26 shows drive waveforms.

FIG. 26 is an explanatory view of voltage waveforms at points A to E in the drive circuit.

An output waveform from the pulse generator coincides with a waveform at the point A shown in FIG. 26, and is inputted to gates of the P-ch FET Q1 and the N-ch FET Q3 on the left side of the drive circuit for the piezoelectric element 12 shown in FIG. 25. The one-shot multi vibrator outputs the pulse having the duration determined by the values of the resistance R3 and the capacitance C2, when the output of the pulse generator changes from the high level to the zero level. The output of the one-shot multi vibrator is inputted to gates of the P-ch FET Q2 and the N-ch FET Q4 on the right side of the drive circuit for the piezoelectric element 12.

When the output from the pulse generator changes from the high level to the zero level, the P-ch FET Q1 is turned on while the N-ch FET Q3 is turned off. At this time, since the output from the one-shot multi vibrator changes from the zero level to the high level, the N-ch FET Q4 is turned on while the P-ch FET Q2 is turned off. The piezoelectric element P1 is rapidly charged with a source voltage V through the P-ch FET Q1 and the N-ch FET Q4.

The duty ratio of the output from the pulse generator is determined such that the output from the pulse generator changes from the zero level to the high level when a sufficient time for completing the rapid charge for the piezoelectric element P1 has elapsed. When the output from the pulse generator changes from the zero level to the high level, the P-ch FET Q1 is turned off while the N-ch FET Q3 is turned on.

The piezoelectric element P1 starts discharging electric charge, which has been charged rapidly, through the resistance R4 and the N-ch FET Q3 in a gentle manner due to the presence of the resistance R4. The pulse from the one-shot multi vibrator is at the high level during approximately a half period of the output of the pulse generator, and the resistance R4 is set such that the piezoelectric element 12 is fully discharged in this duration.

When the output of the one-shot multi vibrator changes from the high level to the zero level, the P-ch FET Q2 is turned on while the N-ch FET Q4 is turned off. Thus, the piezoelectric element P1 starts being charged with a reverse polarity through the P-ch FET Q2, the resistance R4, and the N-ch FET Q3. Also at this time, the charging is carried out in a gentle manner due to the presence of the resistance R4. The output of the one-shot multi vibrator is at the zero level during approximately a half period of the output of the pulse generator, and the piezoelectric element 12 is fully charged with the reverse polarity in this duration.

When a time for one period of the continuous pulses outputted from the pulse generator has elapsed, the output of the pulse generator changes again from the high level to the zero level, and therefore, the P-ch FET Q1 is turned on while the N-ch FET Q3 is turned off again. At this time, since the output from the one-shot multi vibrator changes from the zero level to the high level again, the N-ch FET Q4 is turned on while the P-ch FET Q3 is turned off. By a repetition of the above-described circuit operation, the piezoelectric element 12 is driven using the voltage waveform that is asymmetrical with respect to time, and therefore the drive mechanism of the present invention operates as a force generation device, a linear actuator, and an electric cylinder.

The drive mechanism of the present invention can be operated only for one period of the waveform from the pulse generator. At this time, the block of the pulse generator may be modified so as to operate as a one-shot multi vibrator.

The switch S2 is a switch for reversing the connection of the piezoelectric element P1 in the bridge circuit, and the operation direction of the drive mechanism of the present invention and the direction of outputting the force can be switched by this switch. Instead of providing this switch S2, the direction may be switched by adding an electronic switching element and a resistor and regulating the drive waveforms.

In FIG. 26, A represents the output of the pulse generator and is inputted to the gates of the P-ch FET Q1 and the N-ch FET Q3 in the left half of the bridge circuit. B represents the output of the one-shot multi vibrator and is inputted to the gates of the P-ch FET Q2 and the N-ch FET Q4 on the right side of the bridge circuit. C represents the voltage of one of electrodes of the piezoelectric element P1, and D represents the voltage of the other electrode of the piezoelectric element 12. E represents the source voltage of the N-ch FET Q3.

D-C is the calculation of voltage between the two electrodes of the piezoelectric element 12. It is apparent that the piezoelectric element P1 is rapidly discharged and gently charged in a voltage range of +V to −V.

When the drive circuit drives the piezoelectric element P1 using the asymmetrical voltage waveform, the piezoelectric element P1 expands and contracts. In the expansion and contraction movement, since an expansion speed differs from a contraction speed, the output shaft generates a force to be exerted on the guide member and the restraint member by asymmetrical vibration applied to the output shaft 1. Thus, it is possible to move an object or keep exerting the force on an object, even when a force generated by the drive mechanism cannot move the object or the output shaft is moved against the force generated by the drive mechanism.

REFERENCE SIGNS LIST 1 output shaft
2 guide member
3 side plate
4 side plate
5 cover
7 bottom plate
9 external device
11 lead wire
12 piezoelectric element
14 restraint member
15 object
19 stopper
20 regulating member
21 output member
23 tool attaching screw hole
30 pushing tool
31 press roller tool
35 retaining plate
36 retaining plate

The invention claimed is:

1. A drive mechanism comprising:
 a moving unit including an output shaft having a shape of a rectangular parallelepiped and a vibrator fixed to one of surfaces of the output shaft;
 a guide member having an interface fixed to an external device; and
 a restraint member fixed to the guide member, for restraining the output shaft, together with the guide member, such that the output shaft has a degree of freedom only in a direction of a line connecting a center of a surface to which the vibrator is fixed, out of outer surfaces of the output shaft, to a center of a surface opposite the surface to which the vibrator is fixed, without having other degree of freedom, wherein the vibrator is caused to vibrate so as to apply a vibration to the output shaft and generate a force to move the moving unit relative to the guide member and the restraint member.

2. The drive mechanism according to claim 1, wherein any of an output member and an output member with a tip tool attached thereto is fixed to an end of the output shaft on a side opposite to the vibrator.

3. The drive mechanism according to claim 2, wherein a mass of the output member or the output member with the tip tool attached thereto is four or more times a mass of the vibrator.

4. The drive mechanism according to claim 1, wherein the output shaft continuously exerts a force on an object in a set force output mode by continuous driving, and even if the object is in a constant position or moved to one or both of directions of the degree of freedom of the output shaft, the output shaft follows the object and exerts the force on the object in the set force output mode.

5. The drive mechanism according to claim 1, wherein the output shaft is formed of a carbon fiber reinforced plastic material that uses long carbon fibers oriented in the directions of the degree of freedom of the output shaft and has a volume ratio of the carbon fibers of 60% or more.

6. The drive mechanism according to claim 5, wherein a length of contact portions of the guide member and the restraint member with the output shaft in the directions of the degree of freedom of the output shaft is one-tenth or more of a maximum distance from outside edges of the guide member and the restraint member to a tip end of the output shaft, the output member, or the tip tool in a state where the output shaft is most protruded.

7. The drive mechanism according to claim 5, wherein the carbon fibers used in the output shaft are oriented pitch-based carbon fibers.

8. The drive mechanism according to claim 5, wherein any of perfluoropolyether and chlorotrifluoroethylene, being a fluorinated lubricating oil, is disposed between the output shaft and the guide member or the restraint member as a lubricant.

9. The drive mechanism according to claim 2, wherein the output member or the output member with the tip tool attached thereto continuously exerts a force on an object in a set force output mode by continuous driving, and even if the object is in a constant position or moved to one or both of directions of the degree of freedom of the output shaft, the output member or the output member with the tip tool attached to thereto follows the object and exerts the force on the object in the set force output mode.

10. The drive mechanism according to claim 3, wherein the output member or the output member with the tip tool attached thereto continuously exerts a force on an object in a set force output mode by continuous driving, and even if the object is in a constant position or moved to one or both of directions of the degree of freedom of the output shaft, the output member or the output member with the tip tool attached to thereto follows the object and exerts the force on the object in the set force output mode.

11. The drive mechanism according to claim 2, wherein the output shaft is formed of a carbon fiber reinforced plastic material that uses long carbon fibers oriented in the directions of the degree of freedom of the output shaft and has a volume ratio of the carbon fibers of 60% or more.

12. The drive mechanism according to claim 11, wherein a length of contact portions of the guide member and the restraint member with the output shaft in the directions of the degree of freedom of the output shaft is one-tenth or more of a maximum distance from outside edges of the guide member and the restraint member to a tip end of the output shaft, the output member, or the tip tool in a state where the output shaft is most protruded.

13. The drive mechanism according to claim 11, wherein the carbon fibers used in the output shaft are oriented pitch-based carbon fibers.

14. The drive mechanism according to claim 11, wherein any of perfluoropolyether and chlorotrifluoroethylene, being a fluorinated lubricating oil, is disposed between the output shaft and the guide member or the restraint member as a lubricant.

* * * * *